(12) United States Patent
Yamamura et al.

(10) Patent No.: US 11,718,361 B2
(45) Date of Patent: Aug. 8, 2023

(54) MOVING DEVICE

(71) Applicants: MERCARI, INC., Tokyo (JP); The University of Tokyo, Tokyo (JP)

(72) Inventors: Ryosuke Yamamura, Tokyo (JP); Yoshihiro Kawahara, Tokyo (JP); Ryuma Niiyama, Tokyo (JP); Hiroki Sato, Tokyo (JP); Young ah Seong, Tokyo (JP)

(73) Assignees: MERCARI, INC., Tokyo (JP); THE UNIVERSITY OF TOKYO, Tokyo (JP)

( * ) Notice: Subject to any disclaimer, the term of this patent is extended or adjusted under 35 U.S.C. 154(b) by 130 days.

(21) Appl. No.: 17/334,579

(22) Filed: May 28, 2021

(65) Prior Publication Data

US 2021/0371039 A1  Dec. 2, 2021

(30) Foreign Application Priority Data

Jun. 2, 2020  (JP) .................................. 2020-096193

(51) Int. Cl.
*B62K 19/02* (2006.01)
*B62K 11/02* (2006.01)
(Continued)

(52) U.S. Cl.
CPC ............... *B62K 19/02* (2013.01); *B62J 25/00* (2013.01); *B62K 11/02* (2013.01); *B62K 21/00* (2013.01);
(Continued)

(58) Field of Classification Search
CPC ........ B62K 19/02; B62K 11/02; B62K 21/00; B62K 5/027; B62K 5/06; B62K 2202/00;
(Continued)

(56) References Cited

U.S. PATENT DOCUMENTS 5,637,076 A * 6/1997 Hazard ................ A61H 1/0292
297/284.6
5,687,438 A * 11/1997 Biggie ................ A61G 5/1043
297/284.6
(Continued)

FOREIGN PATENT DOCUMENTS

JP   H09-276552 A   10/1997
JP   2019514482 A   6/2019

OTHER PUBLICATIONS

English-Machine-Translation-of-JP2019514482A, Jun. 6, 2019, 22 pgs.
(Continued)

*Primary Examiner* — Drew J Brown
(74) *Attorney, Agent, or Firm* — Morgan, Lewis & Bockius LLP

(57) ABSTRACT

To provide a moving device that can be used as a mobility device to transport objects and can be improved in portability. The moving device that is movable with rotation of wheels includes a body unit inflated by injection of fluid and deflated by discharge of the fluid, a support body provided on a predetermined surface of the body unit, and the wheels provided in the support body, wherein the interior of a predetermined portion of the body unit that receives a load from an object contacting the body unit is formed with a drop-stitch structure, and the drop-stitch structure after injection of the fluid has tensile forces in directions approximately perpendicular to the direction of the load applied to the predetermined portion by the object.

20 Claims, 8 Drawing Sheets

(51) Int. Cl.
*B62K 21/00* (2006.01)
*B62J 25/00* (2020.01)
*B62K 5/06* (2006.01)
*B62K 5/027* (2013.01)

(52) U.S. Cl.
CPC ............... *B62K 5/027* (2013.01); *B62K 5/06* (2013.01); *B62K 2202/00* (2013.01)

(58) Field of Classification Search
CPC ........ B62K 15/00; B62K 19/16; B62K 21/18; B62K 11/10; B62K 2204/00; B62J 25/00; B62J 25/06; B62B 3/025
See application file for complete search history.

(56) References Cited

U.S. PATENT DOCUMENTS

| | | | | |
|---|---|---|---|---|
| 7,214,119 | B2 * | 5/2007 | Lucas | A63H 3/06 446/470 |
| 8,038,216 | B1 * | 10/2011 | Palmer | A61G 5/1059 297/DIG. 10 |
| 9,545,962 | B2 * | 1/2017 | Pang | B62D 21/14 |
| 10,919,482 | B1 * | 2/2021 | Zoellner | B60R 21/213 |
| 2007/0157391 | A1 * | 7/2007 | Jackson, III | A61G 13/0054 5/713 |
| 2008/0153382 | A1 * | 6/2008 | Borg | B60C 23/00363 446/220 |
| 2009/0043438 | A1 * | 2/2009 | Redmond | B62D 21/16 903/952 |
| 2009/0205893 | A1 * | 8/2009 | Pang | B62D 25/00 903/903 |
| 2014/0110978 | A1 * | 4/2014 | Schneider | A61G 5/1081 297/452.42 |
| 2016/0057971 | A1 * | 3/2016 | Jenkins | A01K 1/0353 119/28.5 |
| 2016/0264121 | A1 * | 9/2016 | Dezen | B60V 3/02 |
| 2017/0158288 | A1 * | 6/2017 | McCleod-Ross | B63B 34/60 |
| 2018/0311089 | A1 * | 11/2018 | Sachdev | A61G 7/05769 |
| 2019/0151198 | A1 | 5/2019 | Juhnke et al. | |
| 2020/0146912 | A1 * | 5/2020 | Gillespie | A61G 7/005 |

OTHER PUBLICATIONS

English Machine Translation of JPH09-276552A. Oct. 28, 1997, 12 pgs.

* cited by examiner

MOVING DEVICE

CROSS-REFERENCE TO RELATED APPLICATION

This application is a continuation application of Japanese Patent Application No. 2020-096193, filed on Jun. 2, 2020, which is incorporated herein by reference in its entirety.

BACKGROUND

Technical Field

The present disclosure relates to moving devices.

Description of Related Art

In recent years, services using personal mobility devices such as shared bicycles and electric kickboard sharing have been attracting attention as a means of "first mile/last mile" traveling from a station or bus stop to a home or other destination.

On the other hand, as a plaything for children, there is known a plaything with a body that can be inflated by injecting air, and wheels, etc. on the bottom surface of the body, which is easy to carry around and requires a reduced storage space when not in use (see, for example, Japanese Patent Application Laid-Open No. H09-276552 (hereinafter, Patent Literature 1)).

SUMMARY

However, conventional personal mobility devices are heavy and large in size, so they lack portability and are not easy to carry around. In addition, although the plaything as described in Patent Literature 1 is highly portable, it lacks stability and cannot be used as a mobility device to transport objects.

One of the objects of the present disclosure is to provide a moving device that can be used as a mobility device to transport objects and can be improved in portability.

A moving device according to an embodiment of the present disclosure is a moving device that is movable with rotation of a wheel, which includes: a body unit inflated by injection of fluid and deflated by discharge of the fluid; a support body provided on a predetermined surface of the body unit; and the wheel provided in the support body; the body unit having a predetermined portion receiving a load from an object contacting the body unit, the predetermined portion having an interior formed with a drop-stitch structure, the drop-stich structure after injection of the fluid having tensile forces in directions approximately perpendicular to a direction of the load applied to the predetermined portion by the object.

According to the disclosed technology, the moving device can be used as a mobility device to transport objects and can be improved in portability.

DETAILED DESCRIPTION

Figure 1:
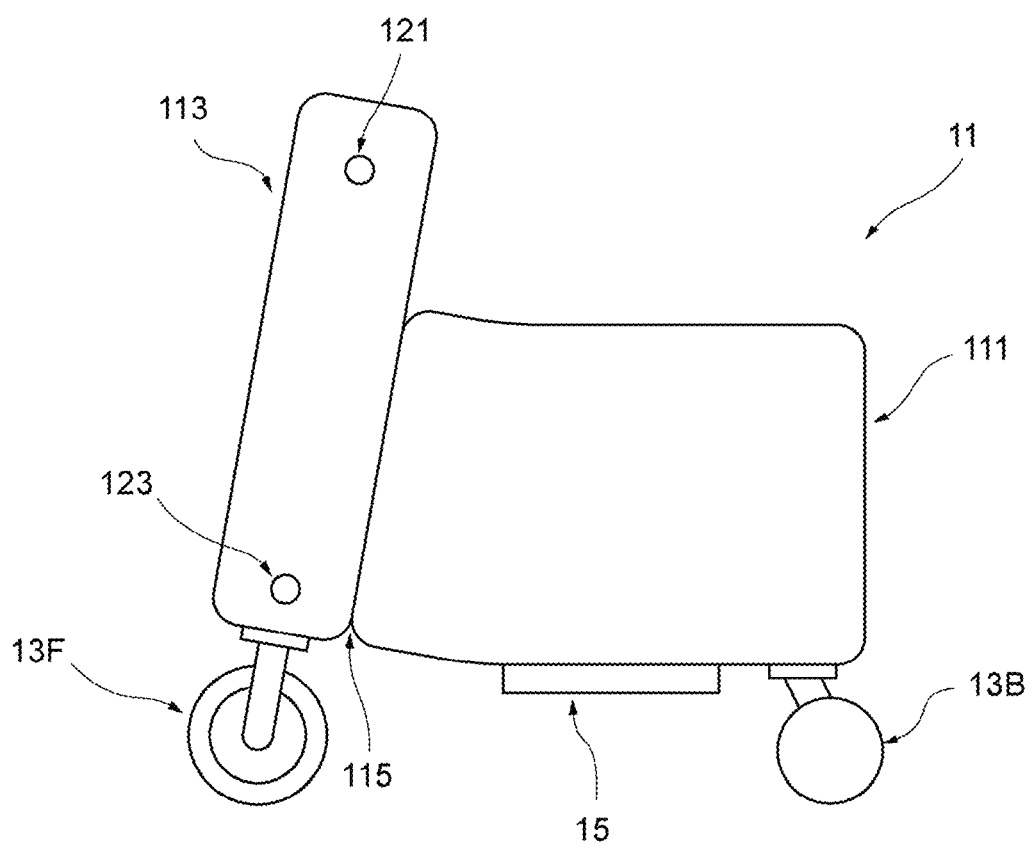
FIG. 1 shows an example of a moving device according to a first embodiment.

Embodiments of the present disclosure will be described in detail below with reference to the drawings. The same elements are denoted by the same reference numerals and the description thereof will not be repeated.

EMBODIMENTS

In the embodiments of the present disclosure, moving devices will be described each having a body unit as the main body that can be inflated or unfolded by injection of fluid, and deflated or folded and stored by discharge of the fluid injected in the body unit. The body unit is made in the sheet form using a material such as thermoplastic polyurethane, vinyl chloride, polyvinyl chloride, polyethylene, polyvinyl, or the like, and the sheets are bonded together at predetermined positions so as to form a predetermined shape when inflated with fluid. Examples of the fluid include air or other gases and water or other liquids.

The moving device has a support body provided on a predetermined surface of the body unit, and a wheel provided in the support body. The support body is made of metal, resin, wood, ceramic, or the like, and is provided on the body unit to connect the wheel and others. The moving device is movable with rotation of the wheel. At least one or more wheels are provided, and the number of wheels can be increased to enhance the stability of movement.

The body unit has a predetermined portion that receives a load from an object contacting the body unit, and the interior of the predetermined portion is formed with a drop-stitch structure. The drop-stitch structure after the injection of fluid has tensile forces in directions approximately perpendicular to the direction of the load applied to the predetermined portion by the object. The object is one that has a certain mass, such as a person or a thing.

The drop-stitch structure uses threads of highly durable fibers bundled together to connect a predetermined fabric surface to a fabric surface on the opposite side facing the predetermined surface, and the countless threads pull the paired fabric surfaces when the structure is filled with fluid. This allows the fluid to be injected into the body unit at high pressure, thereby achieving high rigidity and stability, ensuring that the predetermined shape is maintained.

The countless threads of the drop-stitch structure being stretched in directions perpendicular to the load direction of the object serve to prevent the collapse of the shape of the body unit, which would otherwise be caused by the side surfaces of the body unit being pushed outward by the fluid inside or the bottom surface being pushed further downward with the presence of the load from the object. Further, the countless threads pulling together maintain the shape of the body unit.

As such, the body unit can readily be unfolded or stored by injection or discharge of fluid. In addition, since the inside of the body unit has the drop-stitch structure made up of countless threads extending in directions perpendicular to the load direction of the object, the fluid can be injected into the body unit at high pressure, and both high rigidity and stability are achieved. That is, the moving device of the present disclosure can be used as a mobility device to transport objects and can be improved in portability or carryability. Specific embodiments of the above-described moving device will now be described.

First Embodiment

FIG. 1 shows an example of a moving device according to a first embodiment. In the example shown in FIG. 1, the moving device 10 has a motorcycle shape. As used herein, the motorcycle shape refers to a shape that includes at least two wheels 13F, 13B and includes a body unit 11 that can be unfolded and folded, or inflated and deflated, wherein the body unit 11 has a first section 111 including a seat on which a person sits, and a second section 113 including a handle 121 used for manipulation of the direction of movement. Provided between the first section 111 and the second section 113 is a connecting section 115 that connects the first section 111 and the second section 113.

The first section 111 is, for example, of an approximately rectangular shape, with a height of about 500 mm in a Z direction, a length of about 500 to about 600 mm in an X direction, and a width of about 300 mm in a Y direction by way of example. The second section 113 is, for example, of an approximately rectangular shape, with a height of about 800 mm in the Z direction, a length of about 200 mm in the X direction, and a width of about 300 mm in the Y direction by way of example. The second section 113 is formed, relative to the first section 111, in such a manner that an upper side of the second section 113 is tilted toward the first section 111 on its rear by a predetermined angle from the Z axis. With this, the body unit 11 becomes similar in shape to a motorcycle, offering improved maneuverability and riding comfort.

The connecting section 115 is recessed from side surfaces near the connecting section 115 of the first section 111 and side surfaces near the connecting section 115 of the second section 113 to allow the second section 113 to swivel with respect to the first section 111. That is, the connecting section 115 is located (recessed) in the center direction of the body unit 11 in the Y direction of the depth direction (width direction of the body unit 11) shown in FIGS. 2, 3, etc. with respect to the side surfaces in the Y direction of the first section 111 and the side surfaces in the Y direction of the second section 113. This recess extends over the Z direction, and the recessed connecting section 115 allows the second section 113 to swivel left and right in the Y direction relative to the first section 111. The extent to which the second section 113 can swivel depends on the degree of concavity of the connecting section 115.

The first section 111, the second section 113, and the connecting section 115 may be formed as one piece. In this case, by injecting fluid through an inlet port (not shown) provided in the body unit 11, the first section 111, the second section 113, and the connecting section 115 as shown in FIG. 1 are formed integrally, thereby improving the stability of the body unit 11. The inlet port also serves as a discharge port, for example, and the fluid is injected or discharged when the inlet port is opened by means of a cap, valve, or the like.

The first section 111, the second section 113, and the connecting section 115 may be divided into at least two parts. In this case, the separate parts need only be fixed in a predetermined manner, which allows the moving device 10 to be customized for personal use or the parts to be changed to suit the application.

The handle 121 is of a bar shape extending in the Y direction, for example, and is fixed to the second section 113 by means of screws passing through screw holes on the handle 121 and the corresponding screw holes on a metal plate provided at an upper portion in the Z direction (height direction of the body unit 11) of a side surface of the second section 113. The metal plate is embedded, for example, by being sewn to the side surface of the second section 113. The handle 121 is not limited to the above in terms of its fixing method, shape, etc. All that is required is that the handle 121 be provided on the second section 113 to allow a user to grasp and use it to manipulate the moving direction of the moving device. The handle 121 may attain its shape by being inflated by injection of fluid.

The second section 113 may also have a footrest 123 at a lower portion of each side surface. The footrest 123 needs only be shaped to allow a user's foot to be placed on it. For example, the footrest 123 can be of a bar shape extending in the Y direction, a semicircle shape, or any other shape. The footrest 123, like the handle 121, may be screwed to the second section 113 via screw holes on a metal plate provided at the lower portion in the Z direction of a side surface of the second section 113. The footrest 123 may be formed by injecting fluid or may be joined by joining means. The joining means include means that facilitate attachment and detachment, such as Velcro (registered trademark), fasteners, and the like.

A battery unit 15 is an enclosure having a battery and a drive unit (e.g., a motor) that controls the rotation of the wheel 13F in front and/or the wheels 13B at rear, and may be formed as a support body. The configuration at the bottom of the moving device 10 in the Z direction, or the configuration (including the battery unit 15) provided on the underside of the body unit 11 may be similar to the configuration of a known electric skateboard, and may have, for example, the following specifications.

Maximum speed: 20 km/h
Cruising range: 10 km
In-wheel motor
Motor output: 250 W to 750 W
Battery (Lithium-ion battery)

Figure 2:
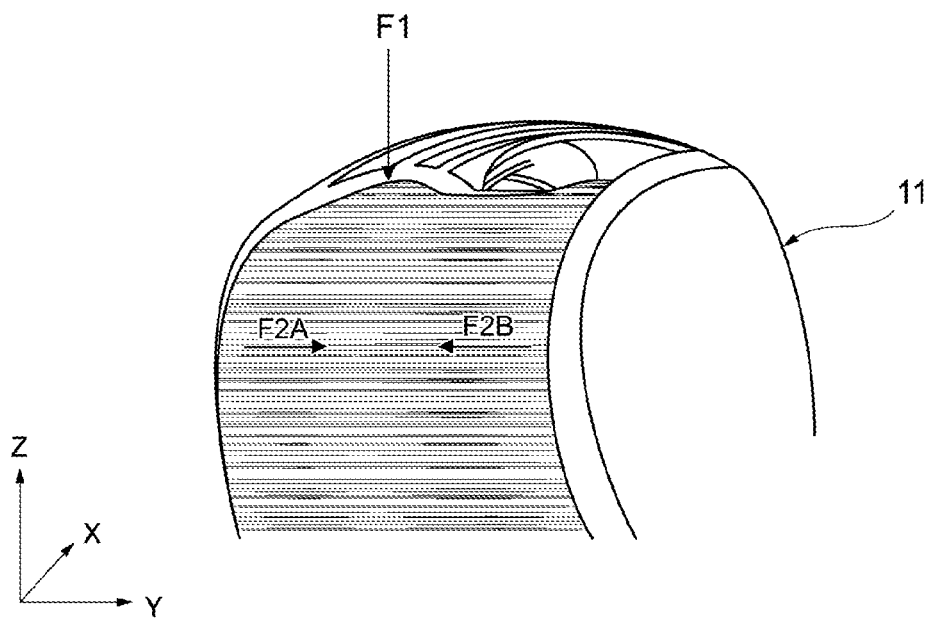
FIG. 2 shows an example of a drop-stitch structure of a body unit according to the first embodiment.

FIG. 2 shows an example of a drop-stitch structure of the body unit 11 according to the first embodiment. In the example shown in FIG. 2, a predetermined portion of the body unit 11 that receives a load from a user sitting on the seat has an interior formed with the drop-stitch structure. In the body unit 11, the drop-stich structure after injection of fluid has tensile forces in directions F2A and F2B approximately perpendicular to the direction F1 of the load applied to the predetermined portion by the user. For example, the user sitting on a seat provided on at least a portion of the upper surface of the body unit 11 applies the load to the seat. Here, approximately perpendicular means that a deviation of a few percent is acceptable, which includes, for example, an angular deviation of a predetermined value from perpendicular.

With this, the body unit 11, e.g., the side surfaces of the first section 111 suffer increased internal pressure due to the load in the load direction F1. However, the tensile forces F2A, F2B of the drop-stitch structure, increasing depending on the internal pressure, pull the side surfaces in the center direction, so the shape of the body unit 11 is maintained, and deflection in the load direction is unlikely to occur. The more the tensile forces of the drop-stitch structure increase, the more the body unit 11 can withstand the load. Therefore, even when a user sits on the first section 111, the first section 111 is less likely to flex downward in the Z direction, which prevents the body unit 11 from contacting the ground during traveling, and ensures stability during the movement. For example, if the relationship of load per unit area of the bottom surface of the body unit 11<tension per unit area of the body unit 11 is satisfied, the moving device 10 becomes easier to prevent wrinkling or folding of the body unit 11 and ensure stability.

For example, the drop-stitch structure is provided in the entire interior of the body unit 11. This allows the body unit to maintain its predetermined shape after the injection of fluid even if the body unit is subjected to a load from an object, and provides stability of movement during transportation.

Figure 3:
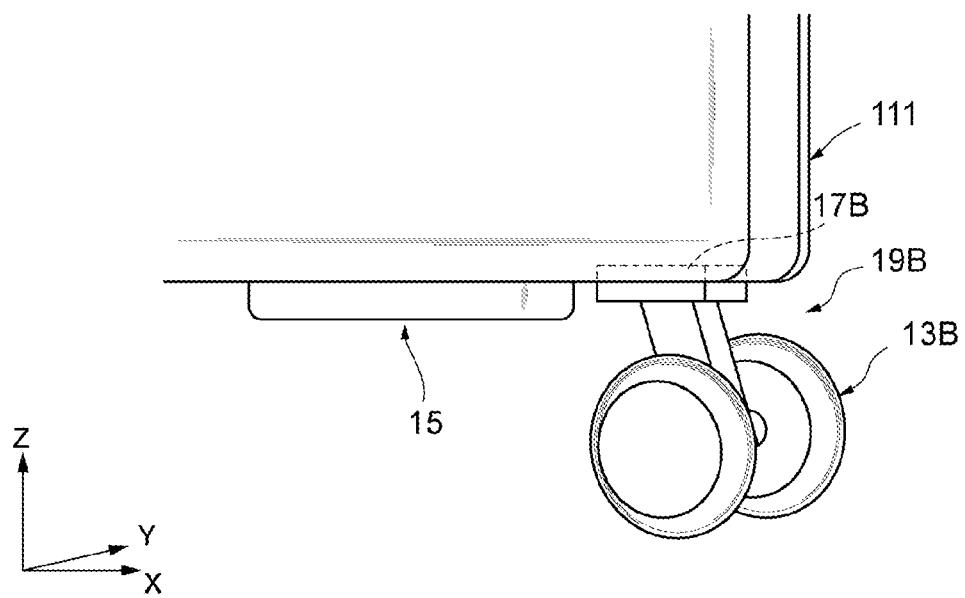
FIG. 3 shows an example of a lower portion at the rear of the moving device according to the first embodiment.

FIG. 3 shows an example of a lower portion at the rear of the moving device 10 according to the first embodiment. In the example shown in FIG. 3, the first section 111 has the battery unit 15 at the bottom (e.g., on the bottom surface) in the Z direction, and the wheels 13B at the rear in the X direction (length direction in the moving device 10). The bottom surface of the first section 111 has a second connection mechanism 17B that can be connected to a first connection mechanism 19B of the support body including the wheels 13B. The first connection mechanism 19B and the second connection mechanism 17B are formed of a rigid material of, for example, metal, resin, wood, ceramic, or the like.

Figure 4:
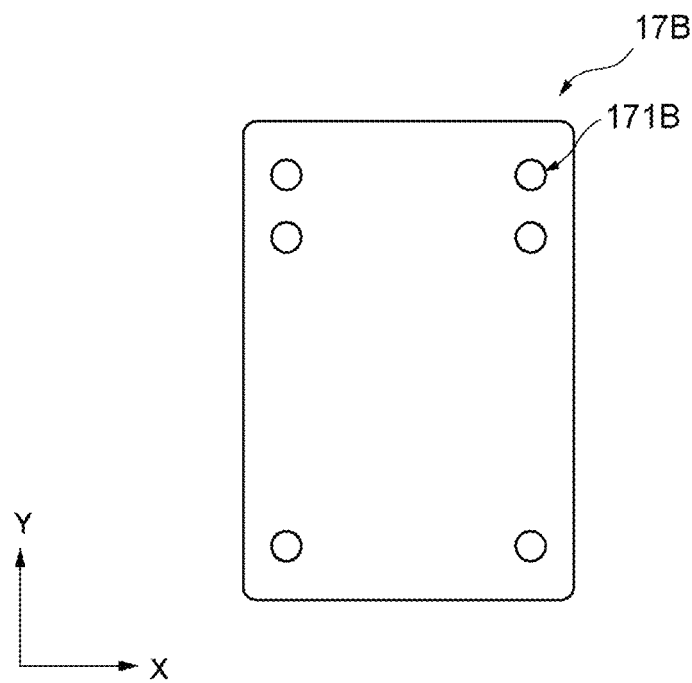
FIG. 4 shows an example of a second connection mechanism according to the first embodiment.

FIG. 4 shows an example of the second connection mechanism according to the first embodiment. In the example shown in FIG. 4, the second connection mechanism 17B is, for example, a metal plate embedded in the first section 111 (e.g., inserted into a sewn pocket or the like). The metal plate has a plurality of holes 171B for receiving screws. With the first connection mechanism 19B on the wheel 13B side being screwed via the screw holes 171B, components on the wheel 13B side are fixed to the first section 111. The components on the wheel 13B side will be described with reference to FIG. 5.

Figure 5:
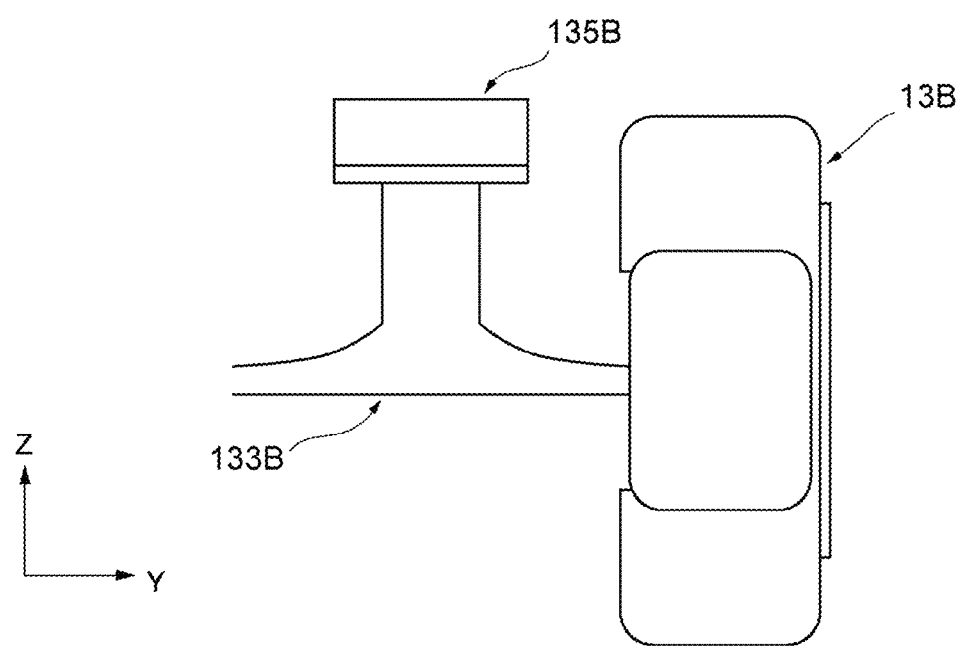
FIG. 5 is a front view showing an example of components on a wheel 13B side according to the first embodiment.

FIG. 5 is a front view showing an example of the components on the wheel 13B side according to the first embodiment. In the example shown in FIG. 5, a spacer (e.g., metal) 135B as the first connection mechanism 19B, for example, has a shaft 133B connected at the bottom in the Z direction, and the wheels 13B are provided at both ends in the Y direction of the shaft 133B (only one wheel shown in FIG. 5). For example, the spacer 135B is connected to the second connection mechanism 17B by screws threaded into the screw holes 171B of the mechanism.

It should be noted that spacers 135B with different heights may be prepared to allow for adjustment of the height in relation to the wheels 13B.

Figure 6:
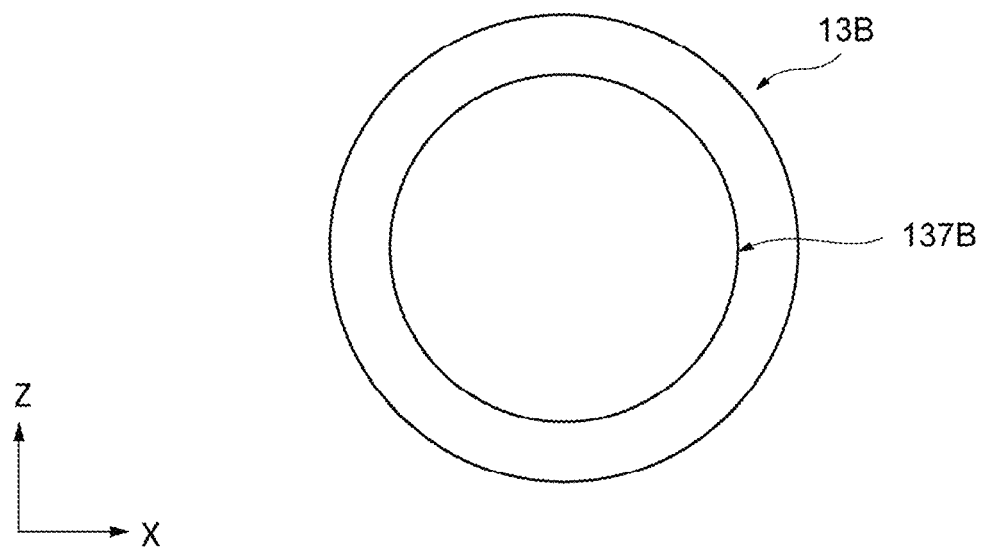
FIG. 6 is a side view showing an example of the wheel 13B according to the first embodiment.

FIG. 6 is a side view showing an example of the wheel 13B according to the first embodiment. In the example shown in FIG. 6, the wheel 13B has its outside formed of hard urethane rubber, for example, as a wheel attachment. This enables the wheel 13B to be increased in diameter. The wheel also has a panel 137B provided inside including the center of the wheel attachment.

Figure 7:
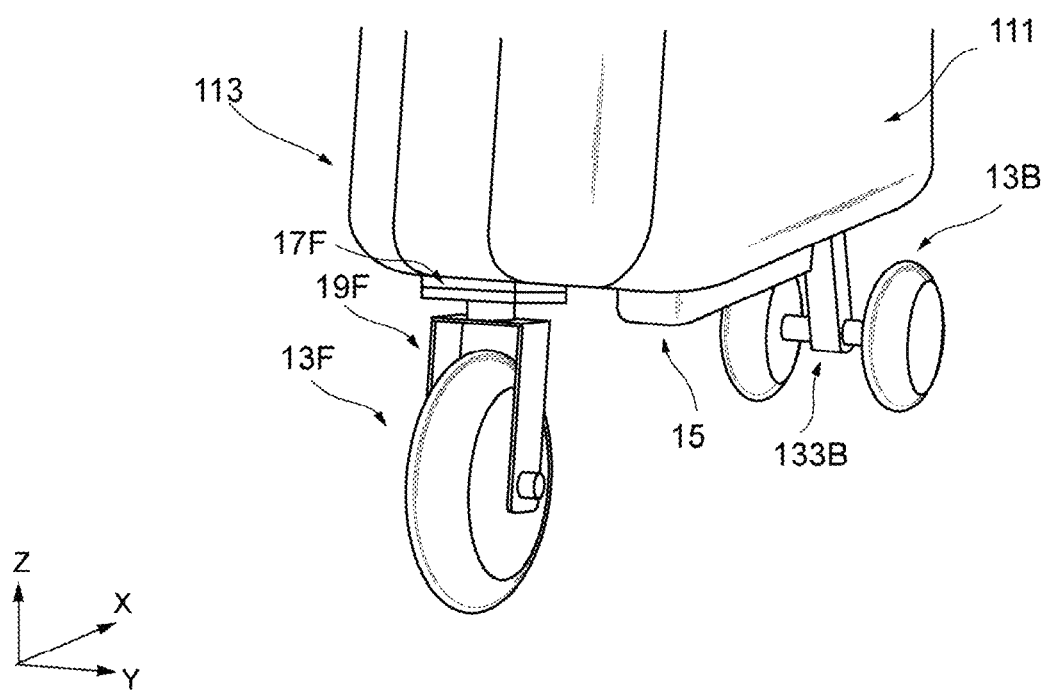
FIG. 7 shows an example of a lower portion at the front of the moving device 10 according to the first embodiment.

FIG. 7 shows an example of a lower portion at the front of the moving device 10 according to the first embodiment. In the example shown in FIG. 7, the wheel 13F in front in the X direction is provided at the bottom in the Z direction of the second section 113. The second section 113 has on its bottom surface a fourth connection mechanism 17F that can be connected to a third connection mechanism 19F including the wheel 13F. The third connection mechanism 19F and the fourth connection mechanism 17F are formed of a rigid material of, for example, metal, resin, or the like.

The fourth connection mechanism 17F is similar to the second connection mechanism 17B shown in FIG. 4, although the number of screw holes may be changed as appropriate. With the third connection mechanism 19F on the wheel 13F side being screwed via the screw holes of the fourth connection mechanism 17F, components on the wheel 13F side are fixed to the second section 113. Making the fourth connection mechanism 17F at the front common with the second connection mechanism 17B at the rear can reduce the production cost.

Figure 8:
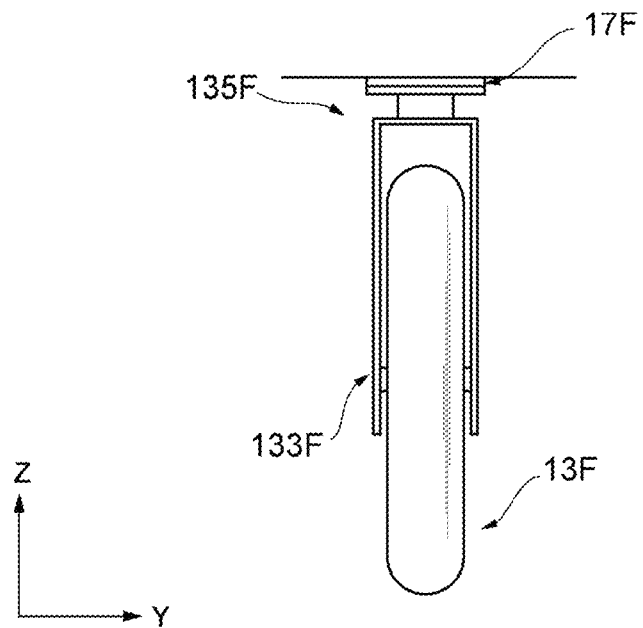
FIG. 8 is a front view showing an example of a wheel 13F portion according to the first embodiment.

FIG. 8 is a front view showing an example of the wheel 13F portion according to the first embodiment. In the example shown in FIG. 8, a fork 135F, for example, as the third connection mechanism 19F has a shaft 133F connected at the bottom in the Z direction, and the wheel 13F is provided on the shaft 133F. For example, the fork 135F has its upper surface in the Z direction connected to the fourth connection mechanism 17F by screws threaded into the screw holes of the mechanism.

Figure 9:
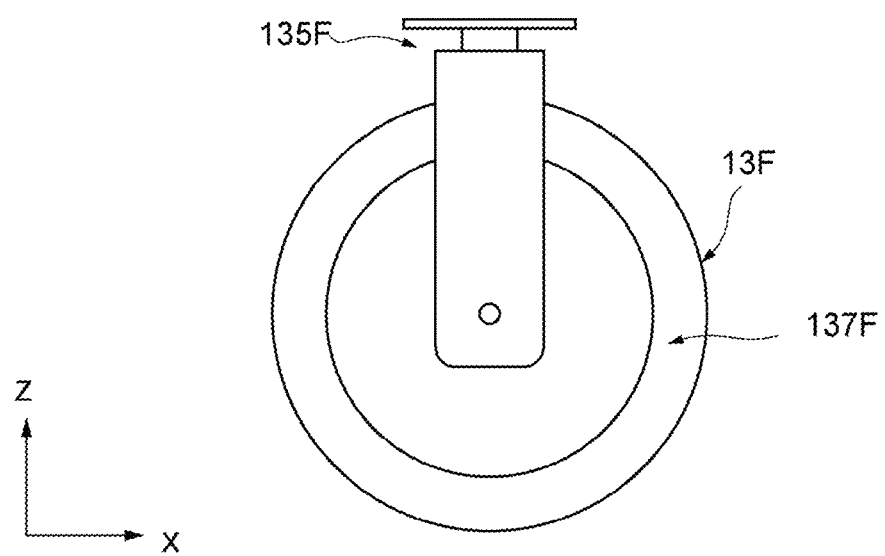
FIG. 9 is a side view showing an example of the wheel 13F according to the first embodiment.

FIG. 9 is a side view showing an example of the wheel 13F according to the first embodiment. In the example shown in FIG. 9, the wheel 13F has its outside formed of hard urethane rubber, for example, as a wheel attachment. The wheel also has a panel 137F provided inside including the center of the wheel attachment.

According to the first embodiment described above, the moving device 10 of the motorcycle shape can be used as a personal mobility device, and discharging the fluid injected inside the body unit 11 allows the body unit 11 to be folded for storage. In addition, the drop-stitch structure inside the body unit 11 reduces the deflection against the load of an object and ensures the stability of the moving device 10. Therefore, the moving device 10 can be used as a mobility device to transport objects and can be improved in portability.

Second Embodiment

Figure 10:
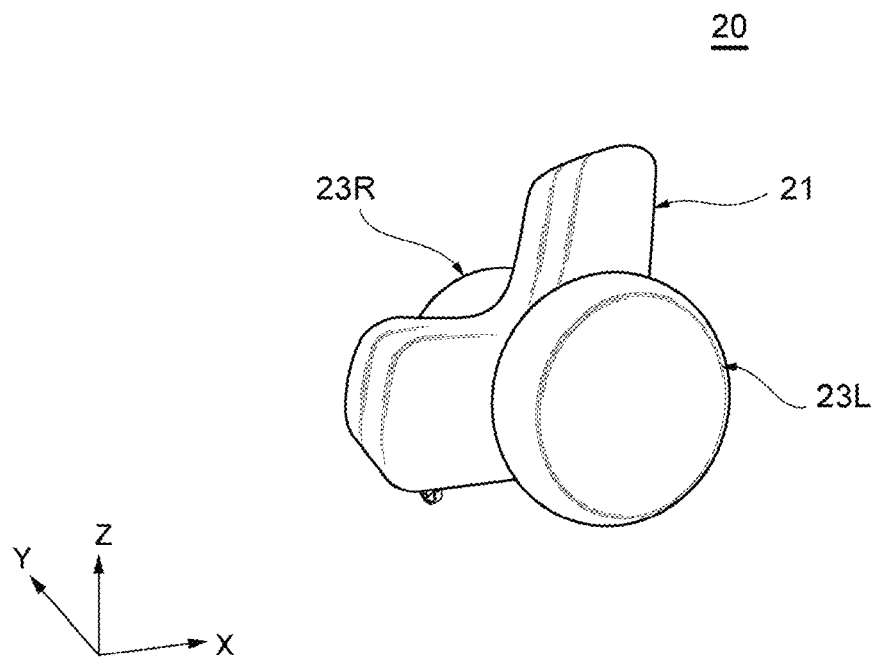
FIG. 10 shows an example of a moving device according to a second embodiment.

FIG. 10 shows an example of a moving device according to a second embodiment. In the example shown in FIG. 10, the moving device 20 has a wheelchair shape. As used herein, the wheelchair shape refers to a shape that includes at least two wheels 23R, 23L and includes a body unit 21 that can be unfolded and folded, or inflated and deflated, wherein the body unit 21 includes a seat for a person to sit on.

The wheels 23R and 23L, as with the body unit 21, may also be configured to be capable of being unfolded and folded, or inflated and deflated, through injection and discharge of the fluid. Connection mechanisms provided at the rotary shafts of the wheels 23R and 23L and support bodies provided on side surfaces in the Y direction of the body unit 21 may be connected with a predetermined connection method. The predetermined connection method may utilize screw fastening as indicated in the first embodiment, or use an easy-to-attach means such as Velcro (registered trademark).

According to the second embodiment described above, the moving device 20 of the wheelchair shape can be used as a personal mobility device, and discharging the fluid injected inside the body unit 21 allows the body unit 21 to be folded for storage. In addition, the drop-stitch structure inside the body unit 21 reduces the deflection against the load of an object and ensures the stability of the moving device 20. Therefore, the moving device 20 can be used as a mobility device to transport objects and can be improved in portability.

Third Embodiment

Figure 11:
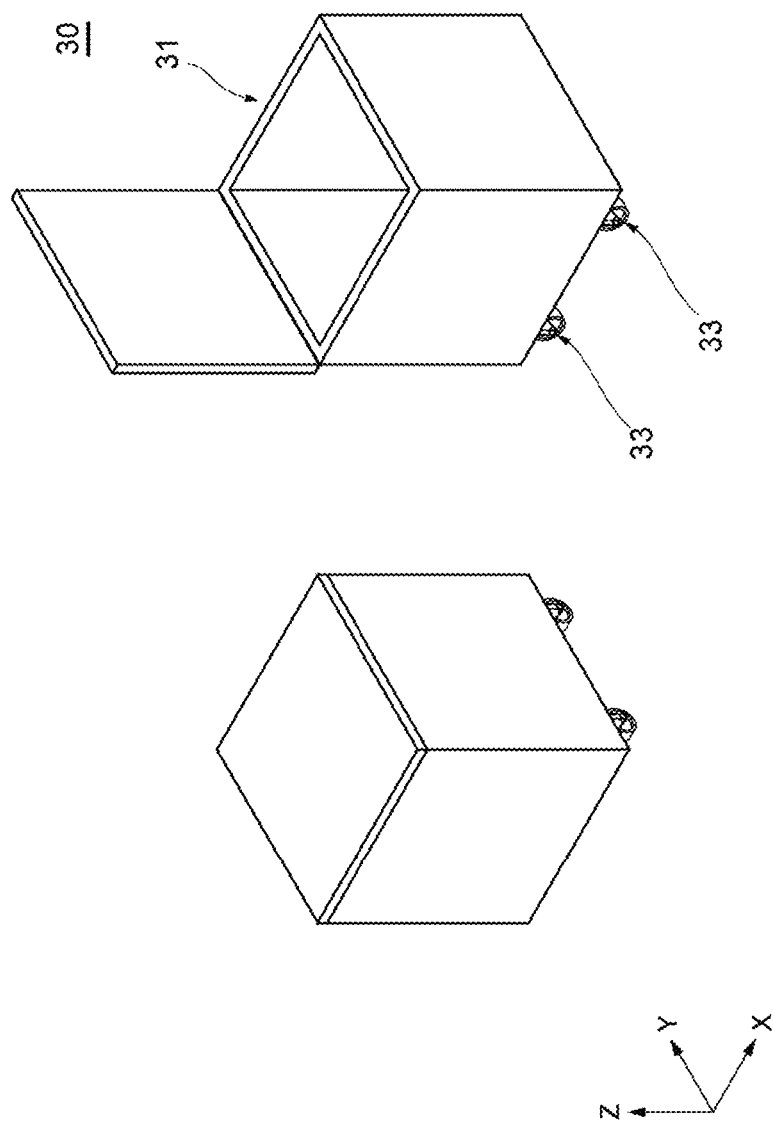
FIG. 11 shows an example of a moving device according to a third embodiment.

FIG. 11 shows an example of a moving device according to a third embodiment. In the example shown in FIG. 11, the moving device 30 has a box shape. As used herein, the box shape refers to a shape that includes a plurality of wheels 33 and includes a body unit 31 that can be unfolded and folded, or inflated and deflated, wherein the body unit 31 has a recessed section to allow for transportation of things.

A connection mechanism including a battery, a drive unit, and the wheels 33 and a support body provided on the bottom surface in the Z direction of the body unit 31 may be connected with a predetermined connection method. The predetermined connection method may utilize screw fastening as indicated in the first embodiment, or use an easy-to-attach means such as Velcro (registered trademark).

According to the third embodiment described above, the moving device 30 of the box shape can be used as a mobility device to transport things, and discharging the fluid injected inside the body unit 31 allows the body unit 31 to be folded for storage. In addition, the drop-stitch structure inside the body unit 31 reduces the deflection against the load of the object and ensures the stability of the moving device 30. Therefore, the moving device 30 can be used as a mobility device to transport objects and can be improved in portability.

The present invention is not limited to the embodiments described above, and can be implemented in various other manners without departing from the gist of the present invention. The above embodiments are in all respects merely illustrative and are not to be construed as limiting.

Modifications

In a modification to the embodiments described above, a plurality of components (basic modules) of a predetermined shape may be combined as appropriate to form the body unit. In addition, the moving device 10 may be equipped with a camera, processor, GPS function, and the like to realize automatic driving or remote-controlled driving.

REFERENCE SIGNS LIST 10, 20, 30: moving device
11, 21, 31: body unit
13, 23, 33: wheel
15: battery unit
17: connection mechanism
19: connection mechanism
111: first section
113: second section
115: connecting section
121: handle
123: footrest

What is claimed is:

1. A moving device that is movable with rotation of a wheel, the device comprising:
   a body unit inflated by injection of fluid and deflated by discharge of the fluid;
   a support body provided on a predetermined surface of the body unit; and
   the wheel provided in the support body;
   the body unit having a predetermined portion receiving a load from an object contacting the body unit, the predetermined portion having an interior formed with a drop-stitch structure, the drop-stitch structure after injection of the fluid having tensile forces in directions approximately perpendicular to a direction of the load applied to the predetermined portion by the object.

2. The moving device according to claim 1, wherein in the case where the body unit is of a motorcycle shape,
   the body unit has a first section including a seat in the predetermined portion, a second section including a handle, and a connecting section between the first and second sections, and
   the connecting section is recessed from side surfaces of the first section near the connecting section and from side surfaces of the second section near the connecting section to allow the second section to swivel with respect to the first section.

3. The moving device according to claim 2, wherein
   the first section has
      a second connection mechanism on a bottom surface, the second connection mechanism being connectable to a first connection mechanism in the support body including the wheel, and
   the second section has
      a footrest at a lower portion on each side surface and
      a fourth connection mechanism on a bottom surface, the fourth connection mechanism being connected to a third connection mechanism including another wheel.

4. The moving device according to claim 1, wherein in the case where the body unit is of a wheelchair shape,
   the body unit includes a seat in the predetermined portion, and
   the support body is on each side surface of the body unit.

5. The moving device according to claim 1, wherein in the case where the body unit is of a box shape, the body unit has a second connection mechanism on a bottom surface, the second connection mechanism being connectable to a first connection mechanism in the support body, the support body including a battery, a drive unit, and the wheel.

6. The moving device according to claim 1, wherein the drop-stitch structure comprises a plurality of fibers bundled together.

7. The moving device according to claim 1, wherein the body unit includes an inlet port for injection of the fluid.

8. The moving device according to claim 7, wherein the inlet port is further configured to operate as a discharge port.

9. The moving device according to claim 7, wherein the inlet port comprises a cap or valve structure.

10. The moving device according to claim 1, wherein the body unit comprises a first section connected to the support body, a second section, and a connecting section coupling the first section and the second section.

11. The moving device according to claim 10, wherein the connecting section is configured to allow the second section to swivel with respect to the first section.

12. The moving device according to claim 10, wherein the second section is connected to a handle and configured to manipulate a direction of movement for the moving device.

13. The moving device according to claim 10, wherein the first section, the second section, and the connecting section are integrally formed as a single piece of material.

14. The moving device according to claim 1, wherein the support body is composed of one or more of metal, resin, wood, and ceramic.

15. The moving device according to claim 1, further comprising a drive unit provided in the support body and configured to control rotation of the wheel.

16. The moving device according to claim 15, further comprising a battery unit provided in the support body and configured to provide power to the drive unit.

17. The moving device according to claim 1, wherein the body unit is configured to be foldable while deflated.

18. The moving device according to claim 1, wherein the body unit comprises a recessed section configured to store one or more objects.

19. The moving device according to claim 1, wherein the predetermined surface of the body unit comprises a connection mechanism configured to connect the body unit to the support body.

20. The moving device according to claim 19, wherein the connection mechanism comprises a plate with a hole configured to receive a screw.

* * * * *